(No Model.) 2 Sheets—Sheet 1.
W. LAHEY.
BELT TIGHTENER FOR SOLE EDGE TRIMMING MACHINES.
No. 450,387. Patented Apr. 14, 1891.
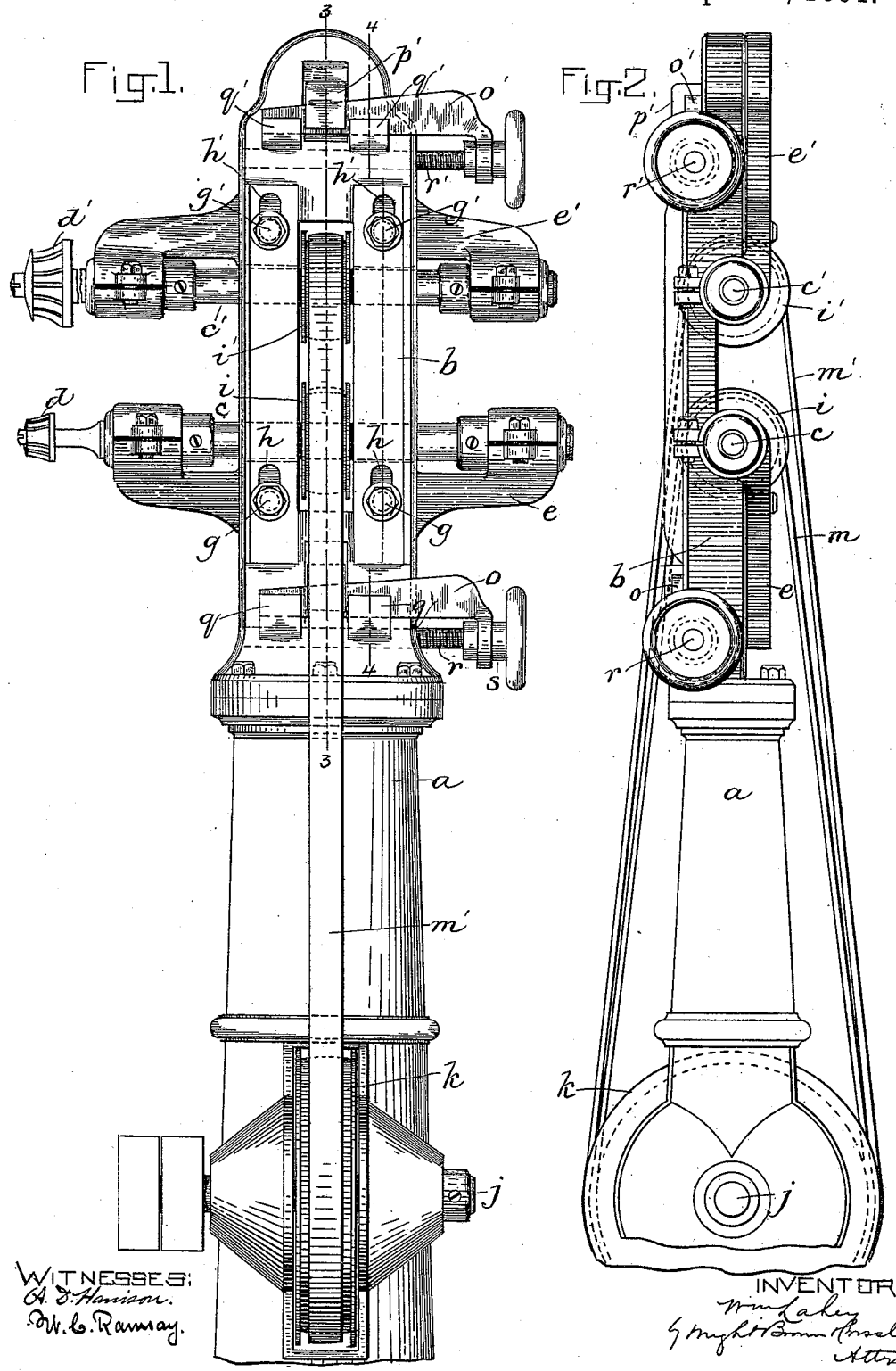

(No Model.) 2 Sheets—Sheet 2.
W. LAHEY.
BELT TIGHTENER FOR SOLE EDGE TRIMMING MACHINES.
No. 450,387. Patented Apr. 14, 1891.
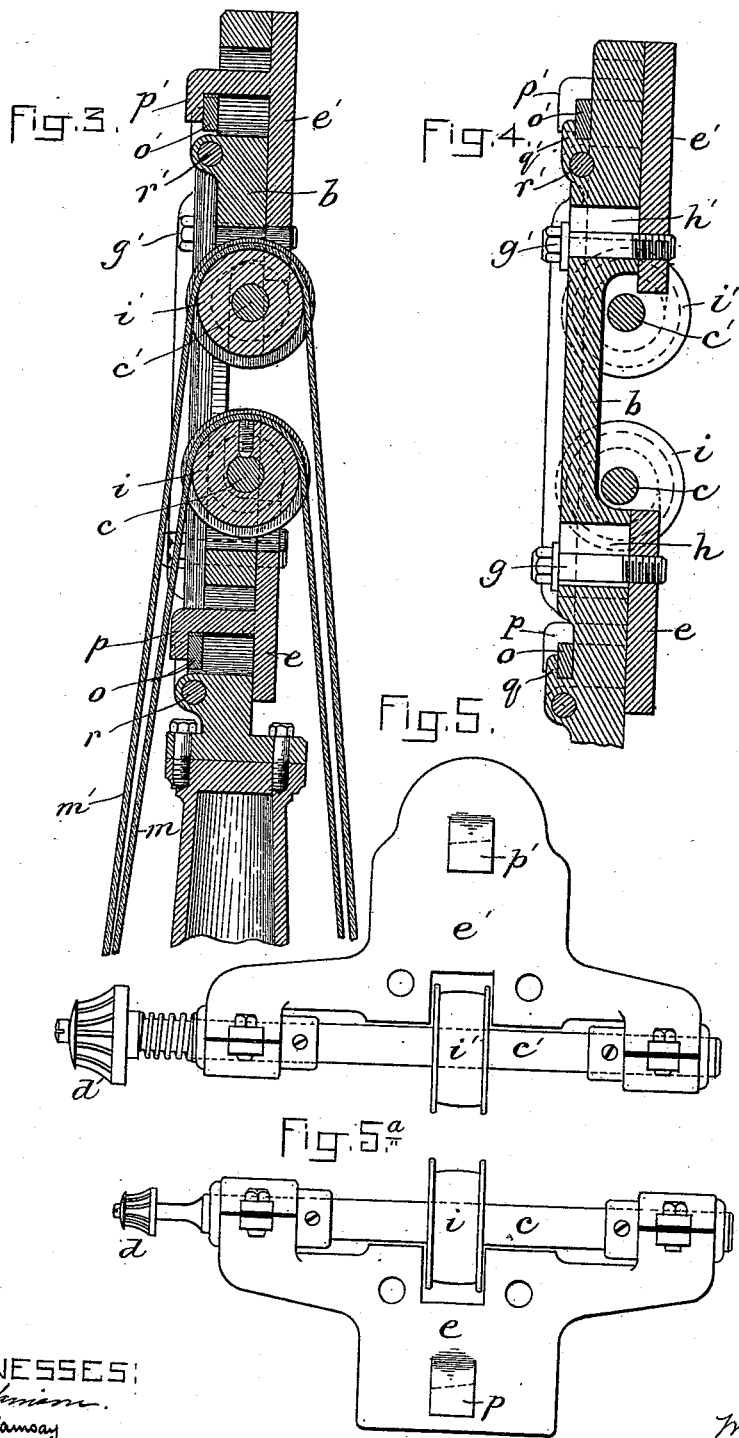

United States Patent Office.

WILLIAM LAHEY, OF STONEHAM, MASSACHUSETTS.

BELT-TIGHTENER FOR SOLE-EDGE-TRIMMING MACHINES.

SPECIFICATION forming part of Letters Patent No. 450,387, dated April 14, 1891.

Application filed January 27, 1890. Renewed March 2, 1891. Serial No. 383,378. (No model.)

*To all whom it may concern:*

Be it known that I, WILLIAM LAHEY, of Stoneham, in the county of Middlesex and State of Massachusetts, have invented certain new and useful Improvements in Belt-Tighteners for Sole-Edge-Trimming Machines, of which the following is a specification.

This invention relates to machines for trimming the edges of boot and shoe soles in which two separate shafts are employed, one having a rotary cutter for trimming the fore part and the other a rotary cutter for trimming the shank-edges of a boot or shoe sole.

The invention has for its object to provide a compact and simple machine of this class, in which both shafts shall be driven from a single pulley on a driving-shaft by two belts, one superimposed upon the other, and in which each shaft shall be adjustable independently of the other to permit the adjustment of its driving-belt.

To these ends the invention consists in the improved construction, which I will now proceed to describe and claim.

Of the accompanying drawings, forming a part of this specification, Figure 1 represents a front elevation of my improved sole-edge-trimming machine. Fig. 2 represents an end elevation of the same. Fig. 3 represents a section on line 3 3 of Fig. 1. Fig. 4 represents a section on line 4 4 of Fig. 1. Fig. 5 represents a side elevation of the shaft carrying the fore-part trimmer and the slide or holder in which said shaft is journaled. Fig. 5ª represents a side elevation of the shaft carrying the shank-edge trimmer and the slide or holder in which said shaft is journaled.

The same letters of reference indicate the same parts in all the figures.

In the drawings, $a$ represents a supporting post or pedestal, to which is attached the frame or head $b$, which supports the shafts $c$ $c'$, that carry, respectively, the shank-trimmer $d$ and the fore-part trimmer $d'$. The shaft $c$ is journaled in bearings in a slide or holder $e$, which is secured to the frame or head $b$ by bolts $g$ $g$, secured to said slide or holder and passing through slots $h$ $h$, formed in the head or frame $b$, said bolts being adapted to be adjusted vertically in said slots, and thus cause the vertical adjustment of the frame $e$ and shaft $c$. The shaft $c'$ is journaled in bearings in a frame $e'$, which is provided with bolts $g'$ $g'$, passing through slots $h'$ $h'$ in the head $b$, said bolts $g'$ and the frame $e'$ thereto attached being also vertically adjustable by the movement of the bolts $g'$ in the slots $h'$. The shaft $c$ has a pulley $i$, and the shaft $c'$ a pulley $i'$, said pulleys being in line with each other, as shown in Fig. 1.

$j$ represents a driving-shaft journaled in bearings in the lower portion of the standard $a$, and provided with a pulley $k$.

$m$ $m'$ represent belts, one of which is superimposed upon the other on the pulley $k$, the inner belt $m$ connecting said pulley with the pulley $i$ on the lower shaft $c$, while the outer belt $m'$ connects the pulley $k$ with the pulley $i'$ on the upper shaft $c'$, both the shaft $c$ and the shaft $c'$ being therefore driven from the one pulley $k$.

$o$ represents a wedge-bar, which is fitted to slide horizontally in socketed lugs $q$ $q$, formed on the lower portion of the head $b$, the upper inclined edge of said wedge supporting the socketed or hooked lug $p$ on the frame or holder $e$, so that by a movement of the bar in one direction the frame or holder $e$ will be raised, while by a movement of said bar in the opposite direction said frame or holder $e$ will be lowered.

$r$ represents a screw, which is fitted in a screw-threaded socket in the lower portion of the head $b$, and has at its outer portion a head or collar $s$, which is grooved to receive an ear on the wedge-bar $o$. The rotation of said screw, therefore, causes it to move the wedge-bar $o$ in one direction or the other, as the case may be.

$o'$ represents a wedge-bar, which is formed like the bar $o$, and is supported by socketed lugs $q'$ $q'$ on the upper portion of the head $b$, and supports the lug $p'$, formed on the upper frame or holder $e'$, said bar $o'$ being provided with an adjusting-screw $r'$, engaged with the head $b$ and with an ear on the bar $o'$ in the same manner that the screw $r$ is engaged with said bar and head.

It will be seen by the foregoing that each cutter-carrying shaft can be adjusted vertically to regulate the tension of its driving-belt independently of the other. It will also be seen that by arranging the two belts on one driving-pulley and the pulleys $i\ i'$ on the driving-shafts in line with each other the machine is simplified and reduced to a compact form.

I claim as my invention—

1. The combination of a supporting-frame, a driving-pulley $k$, journaled in bearings on said frame, the independently-adjustable slides or holders $e\ e'$, adjustably secured to said frame, the shafts $c\ c'$, journaled in bearings on said slides or holders and provided with cutter-heads and with pulleys arranged in line with each other and with the driving-pulley, whereby both shafts may be driven by two belts running on said driving-pulley, one outside of the other, and means for adjusting said slides or holders independently to regulate the tension of the belts and for holding said slides or holders at any positions to which they may be adjusted, as set forth.

2. The combination of the supporting-frame, the driving-pulley $k$, supported by bearings on said frame, the slides or holders $e\ e'$, secured to the frame by bolts passing through vertical slots in the frame, the wedge-bars $o\ o'$, supported by and movable horizontally on socketed lugs on the frame and having inclined edges engaged with the slides or holders $e\ e'$, the adjusting-screws $r\ r'$, engaged with said wedge-bars, the cutter-head-carrying shafts $c\ c'$, journaled in bearings on the slides or holders $e\ e'$ and provided, respectively, with pulleys $i\ i'$, arranged in line with each other and with the driving-pulley $k$, whereby said shafts may be rotated by two belts running on the said driving-pulley, as set forth.

In testimony whereof I have signed my name to this specification, in the presence of two subscribing witnesses, this 20th day of January, A. D. 1890.

WILLIAM LAHEY.

Witnesses:
 C. F. BROWN,
 W. C. RAMSAY.